Patented July 25, 1939

2,167,202

UNITED STATES PATENT OFFICE 2,167,202

FIBER

Stephen P. Gould and Earle O. Whittier, Washington, D. C.; dedicated to the free use of the People in the territory of the United States No Drawing. Application May 28, 1938, Serial No. 210,788

12 Claims. (Cl. 18—54)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People in the territory of the United States to take effect on the granting of a patent to us.

Our invention deals with fibers made from skimmed milk, either sweet or sour.

The objects of our invention are to extrude sweet, sour or concentrated skimmed milk, to which may be added casein or wet casein curd, plasticizers, salts and basic materials, into fibers having the requisite characteristics of strength, water-resistance, flexibility, and softness necessary to make them suitable for use in textiles. These filaments should be valuable as substitutes for wool and other fibers.

Skimmed milk normally contains about 3% of casein, which is a concentration insufficient to form satisfactory fibers. If, however, this concentration is increased by the addition of dry casein or wet curd, so that the total percentage present is between 6–25%, then this milk composition will spin through any type of spinnerette normally used in the rayon industry, and satisfactory fibers can be precipitated by the use of a bath having an acid reaction.

The concentration of the casein can be also raised by condensing the skimmed milk to the proper volume, as for example, to one-third or one-fourth of its initial volume. The milk products known to the trade as "evaporated," "condensed," or "powdered skimmed milk," can also be employed in making up suitable compositions for spinning.

Sour, concentrated, skimmed milk or sour milk reinforced with casein may also be used. The precipitated curd is dissolved and the lactic acid present neutralized by inorganic or organic basic substances (or mixtures of these), as for example, sodium hydroxide or triethanolamine. The lactic acid or lactates serves subsequently to aid in plasticizing the fibers. Other plasticizers, such as ethylene glycol monobutyl ether and/or compounds for hardening and making the fibers water-resistant, such as sodium aluminate or calcium hydroxide, are preferably added to the milk composition.

The following example is given to illustrate a preferred procedure for producing our fibers from skimmed milk. Proportions are given in parts.

Example 1

| | |
|---|---:|
| Concentrated skimmed milk (condensed to one-fourth of its original volume and containing the equivalent of about 24 g. of casein) | 200. |
| A highly sulfated vegetable oil (or its sodium or ammonium salt) | 3.6 |
| A mixture of sodium hexametaphosphate and sodium pyrophosphate | 1.5 |
| Barium hydroxide (Ba(OH)$_2$.8H$_2$O) | 4.42 |
| Water | 30.48 |

(Note.—The barium hydroxide should be previously dissolved in the 30.48 pts. of water, and then added with rapid stirring to the mixture of the three preceding ingredients.)

The temperatures of the spinning composition and the precipitating bath were 50° C. However, other temperatures (room to 80° C.) may be used.

The bath composition was:

| | Parts |
|---|---:|
| Sulfuric acid | 8 |
| Formaldehyde | 5 |
| Dextrose | 20 |
| Water | 67 |

It is understood that other bath compositions may be employed. This procedure gives fibers which are strong, water-resistant, and flexible. It is also understood that our invention is not limited to the above example as proportions, constituents, and substitutes may be varied over a wide range. For example, skimmed milk reinforced with casein, or sour skimmed milk (condensed or reinforced) may be employed in place of the concentrated skimmed milk used, other plasticizers, and metallic hardening compounds, such as sodium aluminate, and/or calcium compounds may be substituted for those given.

Having thus described our invention what we claim for Letters Patent is:

1. A method for producing insoluble flexible fibers, which includes extruding a dispersion comprising skimmed milk, casein added in such an amount as to raise the total protein concentration of the dispersion to between 6 per cent and 25 per cent, a plasticizer, which is compatible with the skimmed milk-casein dispersion, and alkaline earth compounds; thence subjecting the dispersion in the form of fine streams to the action of a precipitating bath, comprising an acid, whereby insoluble flexible fibers are precipitated.

2. A method for producing insoluble flexible fibers, which includes extruding a dispersion comprising skimmed milk, casein added in such an amount as to raise the total protein concentration of the dispersion to between 6 per cent and 25 per cent, a plasticizer, which is compatible with the skimmed milk-casein dispersion, and the class of compounds formed by the reaction of an amphoteric element with an alkali metal; thence subjecting the dispersion in the form of fine streams to the action of a precipitating bath, comprising an acid, whereby insoluble flexible fibers are precipitated.

3. A method for producing insoluble flexible fibers, which includes extruding a dispersion comprising skimmed milk which has been concentrated to such a volume that the casein content lies between 6 per cent and 25 per cent, a plasticizer, which is compatible with the concentrated skimmed milk dispersion, and alkaline earth compounds; thence subjecting the dispersion in the form of fine streams to the action of a precipitating bath, comprising an acid, whereby insoluble flexible fibers are precipitated.

4. A method for producing insoluble flexible fibers, which includes extruding a dispersion comprising skimmed milk which has been concentrated to such a volume that the casein content lies between 6 per cent and 25 per cent, a plasticizer, which is compatible with the concentrated skimmed milk dispersion, and the class of compounds formed by the reaction of an amphoteric element with an alkali metal, thence subjecting the dispersion in the form of fine streams to the action of a precipitating bath, comprising an acid, whereby insoluble flexible fibers are precipitated.

5. A method for producing insoluble flexible fibers, which includes extruding a dispersion made by adding water to powdered skimmed milk until the casein content of the dispersion lies between 6 per cent and 25 per cent, a plasticizer, which is compatible with the powdered skimmed milk dispersion, and alkaline earth compounds; thence subjecting the dispersion in the form of fine streams to the action of a precipitating bath, comprising an acid, whereby insoluble flexible fibers are precipitated.

6. A method for producing insoluble flexible fibers, which includes extruding a dispersion made by adding water to powdered skimmed milk until the casein content of the dispersion lies between 6 per cent and 25 per cent, a plasticizer, which is compatible with the powdered skimmed milk dispersion, and the class of compounds formed by the reaction of an amphoteric element with an alkali metal; thence subjecting the dispersion in the form of fine streams to the action of a precipitating bath, comprising an acid, whereby insoluble flexible fibers are precipitated.

7. A composition suitable for extruding into insoluble flexible fibers, which comprises a fluid mixture of skimmed milk, casein added in an amount sufficient to raise the protein concentration of the mixture to between 6 per cent and 25 per cent, a plasticizer, which is compatible with the skimmed milk-casein dispersion, and alkaline earth compounds.

8. A composition suitable for extruding into insoluble flexible fibers, which comprises a fluid mixture of skimmed milk, casein added in an amount sufficient to raise the protein concentration of the mixture to between 6 per cent and 25 per cent, a plasticizer, which is compatible with the skimmed milk-casein dispersion, and the class of compounds formed by the reaction of an amphoteric element with an alkali metal.

9. A composition suitable for extruding into insoluble flexible fibers, which comprises a fluid mixture of skimmed milk which has been concentrated to such a volume that the casein content lies between 6 per cent and 25 per cent, a plasticizer, which is compatible with the concentrated skimmed milk dispersion, and alkaline earth compounds.

10. A composition suitable for extruding into insoluble flexible fibers, which comprises a fluid mixture of skimmed milk which has been concentrated to such a volume that the casein content lies between 6 per cent and 25 per cent, a plasticizer, which is compatible with the concentrated skimmed milk dispersion, and the class of compounds formed by the reaction of an amphoteric element with an alkali metal.

11. A composition suitable for extruding into insoluble flexible fibers, which comprises an aqueous dispersion of powdered skimmed milk, which has a content of casein varying from 6 per cent to 25 per cent, a plasticizer, which is compatible with the powdered skimmed milk dispersion, and alkaline earth compounds.

12. A composition suitable for extruding into insoluble flexible fibers, which comprises an aqueous dispersion of powdered skimmed milk, which has a content of casein varying from 6 percent to 25 per cent, a plasticizer, which is compatible with the powdered skimmed milk dispersion, and the class of compounds formed by the reaction of an amphoteric element with an alkali metal.

STEPHEN P. GOULD.
EARLE O. WHITTIER.